Nov. 2, 1937.   C. J. MALM   2,097,954
HIGH VISCOSITY ORGANIC ESTERS OF CELLULOSE AND PROCESS OF PREPARING THEM
Filed Sept. 5, 1934

Fig. 1.

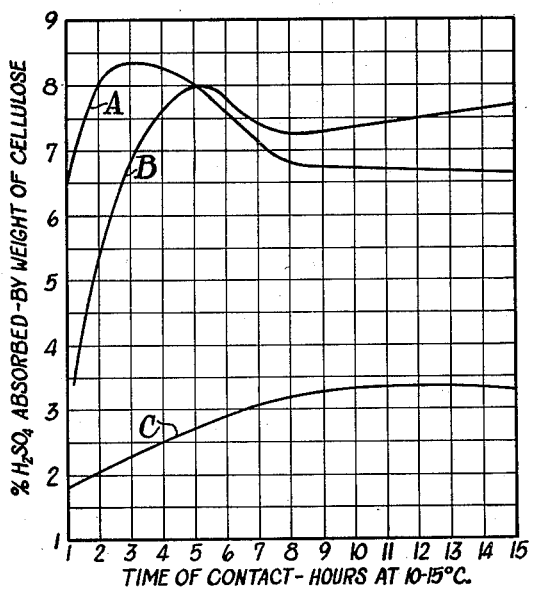

A - 100% ACETIC ACID + 5% ACETIC ANHYDRIDE ADDED

B - 80% ACETIC ACID + 20% PROPIONIC ACID + 5% ACETIC ANHYDRIDE ADDED

C - 20% ACETIC ACID + 80% PROPIONIC ACID + 5% ACETIC ANHYDRIDE ADDED

CONCENTRATION OF $H_2SO_4$ = 0.047 M. APPROX.

Fig. 2.

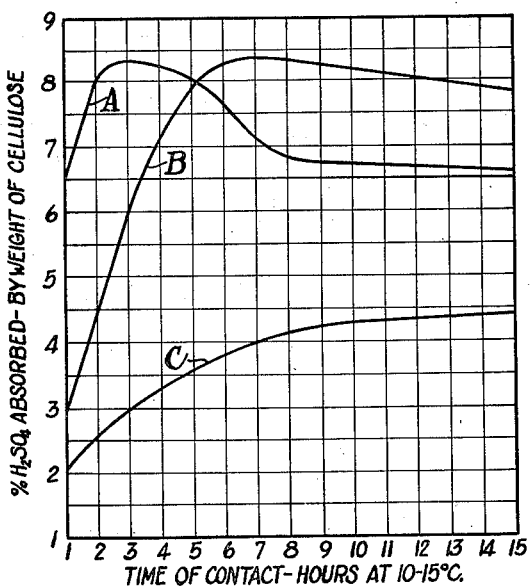

A - 100% ACETIC ACID + 5% ACETIC ANHYDRIDE ADDED

B - 80% ACETIC ACID + 20% BUTYRIC ACID + 5% ACETIC ANHYDRIDE ADDED

C - 20% ACETIC ACID + 80% BUTYRIC ACID + 5% ACETIC ANHYDRIDE ADDED.

CONCENTRATION OF $H_2SO_4$ = 0.047 M. APPROX.

Inventor:
Carl J. Malm,
Newton M. Perrin
Daniel J. Mayne
By   Attorneys.

UNITED STATES PATENT OFFICE 2,097,954

HIGH VISCOSITY ORGANIC ESTERS OF CELLULOSE AND PROCESS OF PREPARING THEM

Carl J. Malm, Rochester, N. Y., assignor, by mesne assignments, to Eastman Kodak Company, Jersey City, N. J., a corporation of New Jersey Application September 5, 1934, Serial No. 742,732

16 Claims. (Cl. 260—101)

This invention relates to a process for the production of high viscosity organic esters of cellulose, the acyl groups of which are predominately acetyl but which include a low percentage of propionyl or butyryl, i. e., a fatty acid group, having three to four carbon atoms inclusive. The invention further relates to the high viscosity organic esters so produced.

The production of high viscosity cellulose acetate has been approached in the prior art at various times with some success. However, such cellulose acetate has been limited in viscosity to a "first stage" or esterification "dope" viscosity of less than 150 seconds. No one, however, seems to have exceeded this first stage viscosity with success or uniformity; occasional batches may have been prepared which attained or even exceeded this viscosity, but in such preparation no certainty of control of the process existed.

I have found that it is possible to produce high viscosity cellulose acetate with repeatable uniform results by omitting all catalyst from the pretreatment of the cellulose with acetic acid, and in the subsequent esterification by the use of a high proportion of catalyst to cellulose, such as from 5 to 10 percent of sulphuric acid and by using a low temperature, such as from 80–90° F., accompanied by very careful control of the conditions of the process. However, even with these somewhat exact conditions, jelling of the cellulose acetate in the reaction mass is very apt to occur, due to the sparse solubility, namely, near lack of solubility, in the esterification bath of the fully esterified cellulose acetate produced.

I have discovered that this tendency of the cellulose acetate to jell in the esterification bath may be overcome by having present in the esterification bath, at the commencement of the esterification, a small amount of propionic or butyric acid. This, I have found, increases the solubility in the esterification bath of the fully esterified cellulose acetate produced, so that critical control of the conditions of the process are no longer necessary to avoid jelling, and the danger of jelling is, therefore, entirely eliminated. By this expedient, I can even obtain a higher viscosity cellulose ester than has ever been obtained in the production of ordinary cellulose acetate previously regarded as of high viscosity, viz, I am able to produce a cellulose ester having a first stage acetic acid—tetrachlorethane viscosity of from 200–300 seconds.

I have. likewise, discovered that to obtain high viscosity cellulose esters rapid, initial absorption of the catalyst by the cellulose fiber should take place for two reasons:—

(1) High catalyst absorption by the cellulose, decreases the degradation of the cellulose by the catalyst itself and (2) High catalyst absorption by the cellulose accelerates the esterification of the celluose so that there is present in the cellulose very shortly after the addition of the esterification mixture, sufficient acyl groups to protect the product against the degrading action of the catalyst in the remainder of the process.

In acetic acid-acetic acid anhydride mixtures, this absorption is high, so that the ratio of catalyst to cellulose can be kept sufficiently low to prevent degradation of the product due to acetolysis in the latter part of the process. However, as above pointed out, the cellulose acetate is so near to insolubility in the esterification mixture that jelling of the cellulose acetate is apt to occur at any moment, during the process with resulting ruination of the cellulose acetate for the purpose intended.

I have discovered that by having present in the esterification mixture at the start of the esterification, a small amount of propionic or butyric acid, so that 5%–40% and preferably 10%–20% of the total acyl in the bath is propionyl and/or butyryl, that the degree of absorption of the catalyst by the cellulose fiber is not materially lessened but that the solubility of the resulting cellulose ester in the esterification bath is very greatly increased, so that jelling of the cellulose ester does not occur, critical control of the esterification conditions is no longer necessary and products of even higher viscosity than I could heretofore obtain can be produced. In this connection, it is to be noted that my discovery is not comprehended by the prior knowledge in the art (many patents and applications in which I am an inventor) that cellulose mixed esters containing propionyl or butyryl radicals can be prepared by the inclusion of propionic or butyric acid, respectively, in the esterification mixture. In a great deal of the prior art, the mixed esters prepared have contained considerable percentages of propionyl or butyryl radicals, such as from 10 per cent up. While there may have been instances where a small proportion of propionyl may have been introduced into the cellulose, along with a large proportion of acetyl, such processes were not directed to the preparation of high viscosity cellulose acetate, wherein a small amount of propionic or butyric acid was present in order to confer increased solubility upon the cellulose acetate, to prevent jelling during the preparation of a high viscosity product.

In the accompanying drawing forming a part hereof, Figures I and II are graphs comparing the absorption of catalyst occurring when a small amount of propionic or butyric acid is employed in an acetylation mixture with that occurring when such acid is omitted and with that occurring when a large proportion of propionic or butyric acid is employed. As pointed out previously the initial absorption of catalyst by the cellulose is indicative of the avoidance of degradation or breakdown of the cellulose which might occur in the early part of the reaction due to the action of the catalyst therein.

Figure I illustrates graphically the absorption of sulphuric acid by cellulose in an acetylation bath with and without the presence of propionic acid at 10–15° C. with reference to the time of contact of the cellulose with the bath. Curve A shows the percentage absorption of sulfuric acid based on the weight of the cellulose when only acetic anhydride, acetic acid and sulfuric acid are present. Thus it may be seen that the absorption of catalyst is high in the initial stages and on this account the degradation of the cellulose is minimized. The percentage of catalyst absorbed obviously decreases when acetylation occurs hence the dropping of the curve after the peak point; however, the cellulose still contains a high relative percentage of catalyst. The danger of degradation which is present initially has passed to a large degree after the peak point due to the presence of acetyl groups in the cellulose. As pointed out above this process of making cellulose acetate has the one disadvantage that jelling is prone to occur which interferes with its use upon a commercial scale. Altho curve A shows a higher absorption than curve B, due to this jelling and the control and limitation of conditions necessary when only acetic acid, acetic anhydride and catalyst are used, it has never been possible to my knowledge to produce a cellulose acetate having a viscosity as high as that of the cellulose esters which may be produced by the present invention.

Curve B illustrates graphically the absorption of catalyst by cellulose when a small amount of propionic acid is present in the mixture, replacing a portion of the acetic acid of the previous bath. In this case altho neither the rate of absorption nor the percentage of catalyst absorbed is quite as high as in the case illustrated by curve A, the absorption is, as a practical matter, amply sufficient to prevent degradation of the cellulose in the initial stages. In practice, jelling of the reaction mixture does not occur in the presence of a small amount of propionic acid and yet the product obtained has a higher viscosity than has been obtained when the propionic acid was omitted. Curve C illustrates the poor absorption of catalyst by the cotton when a large proportion of propionic acid is present which is therefore accompanied by degrading of the cellulose. Thus it may be seen that if the proportion of the higher acid is too high, absorption of the catalyst by the cellulose is poor and degradation of the cellulose occurs under esterifying conditions. As pointed out above the optimum critical proportion of the propionic acid to which the absorption of sufficient catalyst by the cellulose to prevent degradation is restricted, is that which will assure the presence of not more than 40% of propionyl of the total acyl in the bath.

The curves of Figure II are analogous to those of Figure I, the difference being that Figure II represents the same relations for the use of butyric acid as are represented in Figure I with reference to propionic acid. The discussion of Figure I above with reference to the use of propionic acid is also applicable to the use of butyric acid as illustrated by Figure II and the critical limitation to 40% butyryl also applies.

In arriving at the data for these Figs. I and II the concentration of sulfuric acid in each case was 0.047 molal and the proportion of cellulose in the form of cotton used was 1 part to every 20 parts of liquid.

Not only does the absorption of catalyst by the cellulose fibers have a value for inhibiting the degradation of the cellulose in the acylation but the rate at which the esterification takes place is increased, in fact the rate of esterification during the first part of the acylation is approximately directly proportional to the amount of catalyst absorbed.

When a cellulose such as cotton is treated with a fatty acid containing sulfuric acid I have found that maximum degradation occurs when the cellulose absorbs approximately ⅓ of 1% of its weight of sulfuric acid. To prepare a high viscosity product the percentage of catalyst absorbed by the cellulose, based upon the weight of the cellulose, should be above 3% and preferably above 6% or even more.

As explained above there are at least two factors which influence the percentage of sulfuric acid absorbed by the cellulose, namely: (1) the percentage of sulfuric acid based on the weight of cellulose which is present in the esterification mixture and (2) the constitution of the non-catalytic portion of the bath. Based on the weight of the cellulose, the percentage of sulfuric acid in the reaction mixture to assure sufficient absorption in accordance with the present invention should at least exceed 4% and preferably exceed 6% or even 8% to assure the absorption of sufficient sulfuric acid by the cellulose to inhibit degradation in the early stages of the esterification.

The upper limit of sulfuric acid depends on the temperature at which the reaction is carried out, the speed of reaction desired and the amount of higher acyl which is present in the reaction mixture. This upper limit may be 15% or 20% or even more (based on the weight of the cellulose) depending on these conditions.

It is preferred that in most cases the temperature of the reaction mixture be kept in the neighborhood of 70°–100° F., however, this may be varied in accordance with the percentage of catalyst employed. For example with the percentages of sulfuric acid (based on the cellulose) employed in the examples, the temperature of the esterification mixture generally should not exceed 90° F. At an esterification temperature of 100° F. with this amount of catalyst there is objectionable acetolysis of the cellulose and at 110° F. this acetolysis becomes very objectionable. If the proportion of sulfuric acid is greater it is necessary that the temperatures be lower than illustrated above to avoid objectionable acetolysis while when the proportion of sulfuric acid present is less than used in the examples, the maximum temperature permissible may be higher than given above. That the acetolysis which occurs in an esterification is objectionable is evidenced by a marked lessening of the cuprammonium viscosity of the cellulose regenerated from the ester produced compared with the cellulose employed as the starting material.

The sulfuric acid can either all be added to the reaction bath initially or it can be added slowly to the reaction mixture accompanied by agitation in the first part of the esterification provided however that there is sufficient sulfuric acid present initially to avoid any degradation.

In processes in accordance with the present invention it is essential that there be sufficient propionyl or butyryl or both present in the esterification bath to confer solubility which will prevent jelling and yet, as may be seen from the drawing, with large amounts of propionic or butyric acid present in an esterification the absorption of catalyst by the cellulose is poor and thus danger of degrading the cellulose manifests itself; accordingly an excess of propionyl and/or butyryl is not permissible. There should be not less than 5% nor more than 40% of the higher acyl (propionyl and/or butyryl) groups based on the total acyl present in the esterification mixture to obtain satisfactory results. It is preferred that the percentage of higher acyl groups based on total acyl in the esterification bath be between 10% and 20%, particularly approximately 15%. It is to be understood that although the present invention has been described in terms of using propionic or butyric acid in the process, other compounds supplying the propionyl or butyryl groups such as the acid anhydrides may obviously be used in equivalent amounts and wherever the use of such acids is described herein, the use of the anhydrides instead, if desired, is to be understood as taught thereby.

The viscosity of a cellulose ester, such as the acetate, when first prepared and while still dissolved in the reaction mixture, is expressed in terms of its acetic acid-tetrachlorethane viscosity. This may be determined as follows:

Weigh out 20 grams of a completed reaction mixture or esterification dope into a 100 cc. beaker and add 20 cc. of a mixture of equal parts by volume of glacial acetic acid and tetrachlorethane. When the whole is homogeneous and free from lumps, cool to 25° C. and pour into a 12 mm. diameter tube which is kept at 25° C. The viscosity may then be determined by noting the time (in seconds) required for a ⅛ inch glass bead, weighing .05 gram, to drop through a 10 cm. column of the resulting liquid.

The acetic acid-tetrachlorethane "first stage" viscosity of a secondary or hydrolyzed cellulose acetate may be determined as follows:

Dissolve 13 grams of the cellulose ester in 68 grams of glacial acetic acid at 50° C. When the ester is completely dissolved add 13 cc. of 85% acetic anhydride and 5 cc. of a solution of 2 grams of magnesium perchlorate in 80 cc. of glacial acetic acid. Allow the dope to stand for 4 hours at 50–55° C. then dilute with about an equal volume of acetone and precipitate in hot water (85° C.). Wash the precipitate free of acid and dry at 40° C. for 24 hours and then place in a desiccator for 24 hours more. Dissolve 8½ grams of this re-acetylated material in 41½ grams of glacial acetic acid and determine the viscosity on this dope as given above with reference to the acetic acid-tetrachlorethane viscosity of a completed reaction mixture ordinarily referred to as a first stage dope. The acetic acid-tetrachlorethane viscosities of the cellulose esters produced by processes in accordance with the present invention have an acetic acid-tetrachlorethane viscosity of as much as 200–300 seconds while with high viscosity cellulose acetates, acetic acid-tetrachlorethane viscosities of only 100 to 150 seconds at the most are ordinarily obtained. Esterification dopes resulting from the present process in addition to high viscosity exhibit good clarity which is not the case as a rule with high viscosity cellulose acetate dopes, with which as explained above jelling is quite common. Whereas a high viscosity cellulose acetate gave a turbidity of 10 parts per million based on a 1% cellulose acetate solution, esters prepared in accordance with the present invention gave turbidities of only 4–6 parts per million based on a 1% cellulose ester solution. This turbidity was determined by comparing the turbidity of the dope with that of a standard turbidity solution.

Although in processes in accordance with the present invention pretreatment of the cellulose may be dispensed with it is preferred that the cellulose be given a presoaking in acetic acid or in a mixture of the acetic acid and the higher acid, but in the absence of the acylation catalyst, prior to treating it with an esterification bath. The following examples illustrate processes which embody the present invention:

*Example I*

450 pounds of cotton containing 1.8% moisture were added to a mixture of 1820 pounds of glacial acetic acid and 640 pounds of propionic acid and the whole was maintained at a temperature of 100° F. for 4 hours. 1350 pounds of 85% acetic anhydride was then added and the mass was cooled to 45° F. whereupon a mixture of 700 pounds of acetic acid, 25 pounds of acetic anhydride (85%) and 8000 cc. of sulfuric acid (sp. gr. 1.84) was then added and the reaction was allowed to proceed to a maximum temperature of 90° F., at which temperature the mass was maintained until a dope free from grain and fiber was obtained. The total time of the reaction was four hours. The acetic acid-tetrachlorethane viscosity of this first stage dope was determined as described above and was found to be 230 seconds.

The ester was then hydrolyzed by adding 1,000 pounds of 50% acetic acid to the first stage dope and maintaining at a temperature of 100° F. for 45 hours. The turbidity was determined as described above and for a 1% solution of the cellulose ester was 4 parts per million. The product obtained had a content of approximately 3½% propionyl, 36½% acetyl and had a precipitation value of 90%. When it was dissolved in acetone in the proportion of 1 part of ester to 4 of acetone it exhibited a viscosity of 10,000 poises at 25° C. A .005" thick film coated from the solution of this ester in a mixture of 90% ethylene chloride 10% methyl alcohol had a tensile strength of 12 kg/mm$^2$ and flexibility of 18 shopper folds compared to 9 kg/mm$^2$ and 10 folds on a similar film made employing a medium viscosity acetate.

The above example was repeated using 320 instead of 640 parts of propionic acid. The first stage acetic acid-tetrachlorethane viscosity was 170 seconds and the turbidity of the hydrolysis dope for a 1% solution of the ester was 6 parts per million. This ester contained 1½% propionyl.

The above principal example was followed except that acetic acid replaced the propionic acid. A first stage viscosity of 150 seconds was found in this case, however, the hydrolysis dope showed a turbidity for a 1% solution of the ester of 10 parts per million indicating that the dope was beginning to jell.

Example II

The procedure of Example I was repeated except that butyric acid was substituted for propionic acid in the same amount. The acetic acid-tetrachlorethane viscosity of the unhydrolyzed ester was 200 seconds. The turbidity, determined after the hydrolysis mixture had been added, for a 1% solution of the cellulose ester was 6 parts per million. The product obtained had a butyryl content of approximately 4.4% butyryl.

Example III 25 pounds of cotton containing less than 2% water was pretreated with 131 pounds of glacial acetic acid for 3½ hours at 150° F. 75 pounds of 85% acetic anhydride was added and the treatment was continued for one-half hour at 100° F. The mass was cooled to 45–50° F. and a mixture of 44 pounds of fatty acids (4 parts propionic acid to 1 part acetic acid) and 450 cc. of 96% $H_2SO_4$ was slowly added thereto. The temperature was not allowed to exceed 90–95° F. This temperature was maintained until a dope free of grain and fibers was obtained. The first stage dope viscosity was 170 seconds.

A solution consisting of 25 pounds of water, 25 pounds of glacial acetic acid and 820 grams of sodium acetate trihydrate was slowly added at room temperature and the whole was maintained at 100° F. until the ester had hydrolyzed to approximately 38% apparent acetyl. The product was precipitated, washed and dried according to the usual procedure.

The resulting ester was dissolved in 4 parts of acetone which solution exhibited a viscosity of about 5000 poises at 20° C. The solution was employed for the preparation of artificial silk by the evaporative spinning process.

The resulting filaments were found to have a dry strength of 1.70–1.80 grams per denier and a wet strength of 1.15–1.24 grams per denier, a dry stretch of 20%–24% and a wet stretch of 27%–33%. In comparison with ordinary cellulose acetate artificial silk which exhibits a strength when wet of only .65–.75 gram per denier (or even less) it may be seen that the wet strength of the filaments prepared from the high viscosity esters prepared in accordance with the present invention is more than 1½ times that of the ordinary cellulose acetate artificial silk.

Example IV 25 lbs. of cotton was added to a mixture of 50 lbs. of propionic acid and 100 lbs. of glacial acetic acid and the whole was kept at 150° F. for 3 hours. 60 lbs. of acetic anhydride (85%) was then added and the mass was cooled to 45° F. whereupon a mixture of 25 lbs. of propionic acid, 15 lbs. of acetic anhydride (85%) and 448 cc. of sulfuric acid which had been cooled to 40° F. was added. The reaction was then allowed to proceed to a maximum temperature of 85° F., whereupon a clear brilliant dope was obtained. This dope exhibited an acetic acid-tetrachlorethane viscosity of 300 seconds.

The ester formed was then hydrolyzed by adding a mixture of 60 lbs. of acetic acid and 30 lbs. of water to the dope and allowing the mass to stand at 100° F. for 20 hours. The ester was then precipitated out, washed and dried in the usual manner and a sample thereof was analyzed. It was found to have an acetyl content of 36% and a propionyl content of 8.5%.

As was pointed out above the high viscosity cellulose esters of the present invention are superior to cellulose acetate for use in making sheeting or film. The tensile strength of films or sheets made from high viscosity esters containing acetyl and a small proportion of propionyl or butyryl (or both) is greater than that of films or sheets made from ordinary commercial cellulose acetate, its flexibility is better as it exhibits greater fold tolerance and it is longer lived in use than cellulose acetate sheet or film. For instance, perforated films of cellulose acetate and of high viscosity cellulose esters of the present invention containing propionyl and butyryl groups respectively were run thru a machine in which the sprocket did not fit the perforations very well. Taking the life of the acetate sheet as 100, the life of the high viscosity acetyl cellulose containing a small amount of propionyl was more than 126 while that of the ester containing a small amount of butyryl was greater than 170.

A sprocket was then employed which fit the perforations perfectly and the longevity of the film prepared from the esters of the present invention was found to be even more pronounced when compared with that of cellulose acetate film than in the previous instance. For instance, the life of the acetate sheet in this case was taken as 100 and it was found that of a sheet of the propionyl containing ester was more than 405 while the life of a sheet of the butyryl containing ester on the same scale was greater than 510.

High viscosity acetyl-containing fatty acid esters of cellulose whether simple or mixed have been found to be eminently suited for use in the manufacture of laminated or "safety" glass, due to their strength, moisture resistance and excellent clarity. The laminated glass may be prepared by sandwiching together two sheets of glass and a sheet of a high viscosity acetyl-containing cellulose ester, preferably plasticized such as with an alkyl phthalate, in the conventional manner. The laminated glass may be prepared in accordance with the disclosure of McNally and Sweet application Serial No. 660,406 for example as follows:

A transparent sheet of high viscosity cellulose acetate or of a high viscosity cellulose ester prepared in accordance with the present invention may be employed for this purpose. It is preferred that the ester employed have a first stage acetic acid-tetrachlorethane viscosity of at least 150 seconds or even 200 or more seconds and that a plasticizer such as diethyl phthalate be incorporated therewith. The sheet which preferably has a thickness of .02–.03 in. is coated on each side with a solution of a cellulose acetate acid dicarboxylate such as cellulose acetate phthalate in a high boiling liquid plasticizer to form an extremely thin film thereon. This sheet is then placed between two clean glass sheets and the whole is pressed together in a platen press for about 3 minutes at a temperature of 90° C. and a pressure of 100 lbs. per sq. in. The sandwich is then placed in a liquid pressure autoclave, such as is commonly used for this purpose in the glass making industry, and subjected to a uniform liquid pressure of 250 lbs. per sq. in. at a temperature of about 140° C. for about fifteen minutes. The sheet is then cooled and washed resulting in a non-shatterable or "safety" glass of considerably more than ordinary strength and stability.

Thus, the instant invention comprises a method of making organic acid esters of cellulose of exceptionally high viscosity which may be regarded as acetates of cellulose in view of the small amount of propionyl or butyryl which need be present in the esterification mixture. The amounts of higher acyl which are used in the esterification bath are 5%–40%, based on the total acyl in the bath. The higher acyl content in the esterification bath is to be regarded as a means of increasing the solubility of the cellulose ester in the reaction mixture so as to satisfactorily obtain a high viscosity cellulose ester of which the acyl groups are predominantly acetyl. At the same time, this increase in solubility is obtained without sacrificing rapid absorption of the catalyst by the cellulose, so that the obtaining of a high viscosity cellulose ester is still possible.

The instant invention further comprises organic acid esters of cellulose the acyl content of which is predominantly acetyl but which contains approximately 1%–12% of propionyl and/or butyryl and which have an acetic acid-tetrachlorethane first stage viscosity of 170–300 seconds.

As pointed out above these esters are eminently suited for the manufacture of filaments, for instance for producing artificial silk of the rayon type, of sheeting for use as wrapping material or tissue and in the preparation of photographic film and of laminated glass or other laminated products. These esters not only have a greater strength when dry than does cellulose acetate but also when wet the strength of these esters is retained which makes them particularly suitable in the preparation of materials which are subjected the action of water such as fabrics, threads or textile materials. It has long been an objective in the artificial silk art to prepare textile material the strength of which upon wetting such as in washing is amply sufficient to resist any stresses in handling it. A cellulose ester which greatly retains its strength as do the esters of the present invention is a valuable contribution to the artificial silk art.

The great retention of strength of these esters when they become wet is further of value when those esters are employed in photographic film as that film is handled while in the wet state during its development.

In addition to the fact that these esters exhibit great wet strength they are also readily compatible with various plasticizers such as triphenyl or tricresyl phosphate or an alkyl phthalate.

I claim as my invention:

1. A process for treating cellulose to obtain an organic acid ester of cellulose having an acetic acid-tetrachloroethane viscosity of 170–300 seconds and an acyl content predominantly acetyl, which comprises esterifying each unit of cellulose in at least eight units of a bath which is a solvent for the ester produced, the bath including fatty acid groups of 3–4 carbon atoms in the amount of 5%–40% of the bath's total acyl content, sufficient lower fatty acid anhydride to substantially completely acylate the cellulose, and from 4% to about 20% sulphuric acid based on the weight of the cellulose, the esterification being carried out at a temperature which will not cause the ester viscosity to drop below 170 seconds.

2. A process for treating cellulose to obtain an organic acid ester of cellulose having an acetic acid-tetrachloroethane viscosity of 170–300 seconds and an acyl content predominantly acetyl, which comprises esterifying each unit of cellulose in at least eight units of a bath which is a solvent for the ester produced, the bath including propionyl groups in the amount of 5%–40% of the bath's total acyl content, sufficient lower fatty acid anhydride to substantially completely acylate the cellulose, and from 4% to about 20% sulphuric acid based on the weight of the cellulose, the esterification being carried out at a temperature which will not cause the ester viscosity to drop below 170 seconds.

3. A process for treating cellulose to obtain an organic acid ester of cellulose having an acetic acid-tetrachloroethane viscosity of 170–300 seconds and an acyl content predominantly acetyl, which comprises esterifying each unit of cellulose in at least eight units of a bath which is a solvent for the ester produced, the bath including butyryl groups in the amount of 5–40% of the bath's total acyl content, sufficient lower fatty acid anhydride to substantially completely acylate the cellulose, and from 4% to about 20% sulphuric acid based on the weight of the cellulose, the esterification being carried out at a temperature which will not cause the ester viscosity to drop below 170 seconds.

4. A process for treating cellulose to obtain an organic acid ester of cellulose having an acetic acid-tetrachloroethane viscosity of 170–300 seconds and an acyl content predominantly acetyl, which comprises esterifying each unit of cellulose in at least eight units of a bath which is a solvent for the ester produced, the bath including fatty acid groups of 3–4 carbon atoms in the amount of 10–20% of the bath's total acyl content, sufficient lower fatty acid anhydride to substantially completely acylate the cellulose, and from 4% to about 15% sulphuric acid based on the weight of the cellulose, the esterification being carried out at a temperature which will not cause the ester viscosity to drop below 170 seconds.

5. A process for treating cellulose to obtain an organic acid ester of cellulose having an acetic acid-tetrachloroethane viscosity of 170–300 seconds and an acyl content predominantly acetyl, which comprises esterifying each unit of cellulose in at least eight units of a bath which is a solvent for the ester produced, the bath including propionyl groups in the amount of 10%–20% of the bath's total acyl content, sufficient lower fatty acid anhydride to substantially completely acylate the cellulose, and from 4% to about 15% sulphuric acid based on the weight of the cellulose, the esterification being carried out at a temperature which will not cause the ester viscosity to drop below 170 seconds.

6. A process for treating cellulose to obtain an organic acid ester of cellulose having an acetic acid-tetrachloroethane viscosity of 170–300 seconds and an acyl content predominantly acetyl, which comprises esterifying each unit of cellulose in at least eight units of a bath which is a solvent for the ester produced, the bath including butyryl groups in the amount of 10%–20% of the bath's total acyl content, sufficient lower fatty acid anhydride to substantially completely acylate the cellulose, and from 4% to about 15% sulphuric acid based on the weight of the cellulose, the esterification being carried out at a temperature which will not cause the ester viscosity to drop below 170 seconds.

7. The process of treating cellulose to obtain an organic acid ester of cellulose having an acetic acid-tetrachloroethane viscosity of 170–300 seconds and an acyl content predominantly acetyl, which comprises pre-soaking cellulose in a bath predominating in acetic acid and essentially consisting of fatty acids having 2-4 carbon atoms as the only acids therein, then esterifying each unit of pre-soaked cellulose in at least eight units of a bath which is a solvent for the ester produced, the bath including fatty acid groups of 3-4 carbon atoms in the amount of 5%-40% of the bath's total acyl content, sufficient lower fatty acid anhydride to substantially completely acylate the cellulose, and from 4% to about 20% sulphuric acid based on the weight of the cellulose, the esterification being carried out at a temperature which will not cause the ester viscosity to drop below 170 seconds.

8. A process for treating cellulose to obtain an organic acid ester of cellulose having an acetic acid-tetrachloroethane viscosity of 170-300 seconds and an acyl content predominantly acetyl, which comprises esterifying each unit of cellulose in at least eight units of a bath which is a solvent for the ester being produced, the bath including fatty acid groups of 3-4 carbon atoms in the amount of 5%-40% of the bath's acyl content, sufficient lower fatty acid anhydride to substantially completely acylate the cellulose, and from 4% to about 20% sulphuric acid based on the weight of the cellulose, at least a part of the sulphuric acid being added initially, the remainder thereof being added slowly with agitation, and the esterification being carried out at a temperature which will not cause the ester viscosity to drop below 170 seconds.

9. A process for treating cellulose to obtain an organic acid ester of cellulose having an acetic acid-tetrachloroethane viscosity of 170-300 seconds and an acyl content predominantly acetyl, which comprises esterifying each unit of cellulose in at least eight units of a bath which is a solvent for the ester produced, the bath including fatty acid groups of 3-4 carbon atoms in the amount of 10%-20% of the bath's total acyl content, sufficient lower fatty acid anhydride to substantially completely acylate the cellulose, and from 5% to about 10% sulphuric acid based on the weight of the cellulose, the esterification being carried out at a temperature which will not cause the ester viscosity to drop below 170 seconds.

10. The process of making an acetyl cellulose of high viscosity which comprises pre-soaking cellulose in a catalyst-free bath containing a predominating proportion of acetic acid, and then esterifying the pre-soaked cellulose by means of at least 8 parts of a fatty acid bath to each part of cellulose, the bath containing 3 parts of acetic anhydride, 5%-10% sulphuric acid based on the weight of cellulose in the bath, and fatty acid groups of 3-4 carbon atoms in the amount between 10%-20% of the bath's total acyl content, and maintaining the bath at a temperature not exceeding 90° F.

11. An organic acid ester of cellulose which has a 170-300 second acetic acid-tetrachloroethane viscosity, an acyl content which essentially consists of acetyl and a small amount of 3-4 carbon atom acyl groups, and which has the properties of a cellulose ester produced by acylating each unit of cellulose in at least eight units of a bath which is a solvent for the cellulose ester, the bath including 3-4 carbon atom fatty acid groups in the amount of 5%-40% of the bath's acyl content, sufficient lower fatty acid anhydride to substantially completely acylate the cellulose, and from 4%-20% sulphuric acid based on the weight of cellulose, which acylation is carried out at a temperature which did not cause the ester viscosity to drop below 170 seconds.

12. An organic acid ester of cellulose having a viscosity of at least 5000 poises in acetone solution (4 acetone: 1 ester) at 25° C.) and an acyl content which essentially consists of acetyl and a small amount of 3-4 carbon atom acyl groups, the organic acid ester having the properties of a cellulose ester produced by acylating cellulose in at least eight units of a bath per unit of cellulose, the bath being a solvent for the cellulose ester, and including 3-4 carbon atom fatty acid groups in the amount of 5%-40% of the bath's total acyl content, sufficient lower fatty acid anhydride to substantially completely acylate the cellulose, and from 4%-20% sulphuric acid based on the weight of cellulose, the acylation being carried out at a temperature which did not cause the ester viscosity to drop below 170 seconds, and then hydrolyzing the cellulose ester formed.

13. An attenuated colloidized product of unusual wet and dry strengths prepared from an organic acid ester of cellulose having a viscosity of at least 5000 poises in acetone solution (4 acetone: 1 ester) at 25° C.), and an acyl content which essentially consists of acetyl and a small amount of 3-4 carbon atom acyl groups, the organic acid ester having the properties of a cellulose ester produced by acylating cellulose in at least eight units of a bath per unit of cellulose, the bath being a solvent for the cellulose ester, and including 3-4 carbon atom fatty acid groups in the amount of 5%-40% of the bath's total acyl content, sufficient lower fatty acid anhydride to substantially completely acylate the cellulose, and from 5%-10% sulphuric acid based on the weight of cellulose, the acylation being carried out at a temperature which did not cause the ester viscosity to drop below 170 seconds, and then hydrolyzing the acetyl cellulose to acetone solubility.

14. A yarn of unusually high wet and dry strengths comprising filaments of an organic acid ester of cellulose having a viscosity of at least 5000 poises in acetone solution (4 acetone: 1 ester) at 25° C.), and an acyl content which essentially consists of acetyl and a small amount of 3-4 carbon atom acyl groups, the organic acid ester having the properties of a cellulose ester produced by acylating cellulose in at least eight units of a bath per unit of cellulose, the bath being a solvent for the cellulose ester, and including 3-4 carbon atom fatty acid groups in the amount of 5%-40% of the bath's total acyl content, sufficient lower fatty acid anhydride to substantially completely acylate the cellulose, and from 5%-10% sulphuric acid based on the weight of cellulose, the acylation being carried out at a temperature which did not cause the ester viscosity to drop below 170 seconds, and then hydrolyzing the acetyl cellulose to acetone solubility.

15. A yarn of unusually high wet and dry strengths comprising filaments of a cellulose acetate propionate having a viscosity of at least 5000 poises in acetone solution (4 acetone: 1 ester) at 25° C.), the cellulose acetate propionate having the properties of an acetyl cellulose produced by acylating cellulose in at least eight units of a bath per unit of cellulose, the bath being a solvent for the cellulose ester, and including propionyl groups in the amount of 10%-20% of the bath's total acyl content, sufficient lower fatty acid anhydride to substantially completely acylate the cellulose, and from 5%-10% sulphuric acid based on the weight of cellulose, the acylation being carried out at a temperature which did not cause the ester viscosity to drop below 170 seconds, and then hydrolyzing the acetyl cellulose to acetone solubility.

16. A yarn of unusually high wet and dry strengths comprising filaments of cellulose acetate butyrate having a viscosity of at least 5000 poises in acetone solution at 25° C. the cellulose acetate butyrate having the properties of an acetyl cellulose produced by acylating cellulose in a bath which is a solvent for the acetyl cellulose, the bath including a small proportion of butyryl and a large proportion of liquid, sufficient lower fatty acid anhydride to substantially completely acylate the cellulose, and from 5%-10% sulphuric acid based on the weight of cellulose, the acylation being carried out at a temperature which does not cause the ester viscosity to drop below 170 seconds, and then hydrolyzing the acetyl cellulose to acetone solubility.

CARL J. MALM.